United States Patent
Kataoka et al.

(10) Patent No.: US 10,230,991 B2
(45) Date of Patent: Mar. 12, 2019

(54) SIGNAL-PROCESSING APPARATUS INCLUDING A SECOND PROCESSOR THAT, AFTER RECEIVING AN INSTRUCTION FROM A FIRST PROCESSOR, INDEPENDANTLY CONTROLS A SECOND DATA PROCESSING UNIT WITHOUT FURTHER INSTRCUCTION FROM THE FIRST PROCESSOR

(75) Inventors: Tomonori Kataoka, Oonojyo (JP); Hideshi Nishida, Nishinomiya (JP); Kouzou Kimura, Toyonaka (JP); Nobuo Higaki, Kobe (JP); Tokuzo Kiyohara, Osaka (JP)

(73) Assignee: SOCIONEXT INC., Kanagawa (JP)

(*) Notice: Subject to any disclaimer, the term of this patent is extended or adjusted under 35 U.S.C. 154(b) by 1370 days.

(21) Appl. No.: 12/179,873

(22) Filed: Jul. 25, 2008

(65) Prior Publication Data

US 2008/0307198 A1 Dec. 11, 2008

Related U.S. Application Data

(62) Division of application No. 10/919,238, filed on Aug. 17, 2004, now abandoned.

(30) Foreign Application Priority Data

Aug. 21, 2003 (JP) ................................. 2003-297227

(51) Int. Cl.
*G06F 9/38* (2018.01)
*H04N 19/86* (2014.01)
(Continued)

(52) U.S. Cl.
CPC .......... *H04N 19/86* (2014.11); *G06F 9/3885* (2013.01); *H04N 19/42* (2014.11); *H04N 19/436* (2014.11);
(Continued)

(58) Field of Classification Search
CPC .... G06F 9/3877; G06F 9/3885; G06F 9/3887; G06F 9/3889; G06F 9/3891
(Continued)

(56) References Cited

U.S. PATENT DOCUMENTS

| 4,924,328 A | 5/1990 | Endoh et al. |
| 5,003,256 A | 3/1991 | Merrill |

(Continued)

FOREIGN PATENT DOCUMENTS

| CN | 1410993 | 4/2003 |
| JP | 5-20283 | 1/1993 |

(Continued)

OTHER PUBLICATIONS

European Search Report dated Mar. 26, 2009 for European Application No. 04019387.2.

(Continued)

*Primary Examiner* — Jacob Petranek
(74) *Attorney, Agent, or Firm* — Wenderoth, Lind & Ponack, L.L.P.

(57) ABSTRACT

A signal-processing apparatus includes an instruction-parallel processor, a first data-parallel processor, a second data-parallel processor, and a motion detection unit, a de-blocking filtering unit and a variable-length coding/decoding unit which are dedicated hardware. With this structure, during signal processing of an image compression and decompression algorithm needing a large amount of processing, the load is distributed between software and hardware, so that the signal-processing apparatus can realize high processing capability and flexibility.

2 Claims, 12 Drawing Sheets

(51) Int. Cl.
*H04N 19/61* (2014.01)
*H04N 19/44* (2014.01)
*H04N 19/42* (2014.01)
*H04N 19/436* (2014.01)
*H04N 19/523* (2014.01)

(52) U.S. Cl.
CPC .......... *H04N 19/44* (2014.11); *H04N 19/523* (2014.11); *H04N 19/61* (2014.11)

(58) Field of Classification Search
USPC ........................................................ 712/28
See application file for complete search history.

(56) References Cited

U.S. PATENT DOCUMENTS

| | | | |
|---|---|---|---|
| 5,355,508 A | 10/1994 | Kan | |
| 5,530,889 A | 6/1996 | Kametani | |
| 5,588,152 A | 12/1996 | Dapp et al. | |
| 5,623,312 A | 4/1997 | Yan et al. | |
| 5,978,838 A * | 11/1999 | Mohamed | G06F 9/30036 709/208 |
| 6,425,054 B1 | 7/2002 | Nguyen | |
| 6,427,201 B1 | 7/2002 | Ohba | |
| 6,782,368 B2 | 8/2004 | Fujii et al. | |
| 6,912,638 B2 * | 6/2005 | Hellman et al. | 711/167 |
| 6,944,746 B2 * | 9/2005 | So | 712/34 |
| 7,167,971 B2 * | 1/2007 | Asaad et al. | 712/34 |
| 7,200,723 B1 * | 4/2007 | Ansari et al. | 711/154 |
| 2001/0033617 A1 | 10/2001 | Karube et al. | |
| 2002/0007436 A1 | 1/2002 | Yoshida | |
| 2002/0013633 A1 | 1/2002 | Kodama | |
| 2002/0133689 A1 * | 9/2002 | Park | G06F 9/30149 712/34 |
| 2002/0135583 A1 | 9/2002 | Ohba | |
| 2002/0184471 A1 | 12/2002 | Hatae et al. | |
| 2003/0014264 A1 | 1/2003 | Fujii et al. | |
| 2004/0088524 A1 * | 5/2004 | Chauvel et al. | 712/205 |
| 2004/0142717 A1 * | 7/2004 | Schmidt | G06F 9/30036 455/550.1 |

FOREIGN PATENT DOCUMENTS

| | | |
|---|---|---|
| JP | 05-324018 | 12/1993 |
| JP | 7-122866 | 12/1995 |
| JP | 10-507321 | 7/1998 |
| JP | 11-65989 | 3/1999 |
| JP | 2884831 | 4/1999 |
| JP | 11-239348 | 8/1999 |
| JP | 2000-259579 | 9/2000 |
| JP | 2000-311132 | 11/2000 |
| JP | 2001-309386 | 11/2001 |
| JP | 2002-24084 | 1/2002 |
| JP | 2002-41285 | 2/2002 |
| JP | 2002-358288 | 12/2002 |
| WO | 96/05689 A2 | 2/1996 |
| WO | 96/05689 A3 | 2/1996 |
| WO | 00/43868 | 7/2000 |

OTHER PUBLICATIONS

E. Iwata et al., "A 2.2 GOPS Video DSP with 2-Risc MIMD, 6-PE SIMD Architecture for Real-Time MPEG2 Video Coding/Decoding", 1997, IEEE International Solids-State Circuits Conference. Digest of Technical Papers, Feb. 6-8, 1997, San Francisco, CA, pp. 258-259, XP002518296, ISSCC. First Edition, vol. 40 (Cat. No. 97CH36014), IEEE New York, NY.

B. Furht, "Processor Architectures for Multimedia: A Survey", Proceedings of 1997 International Conference on Multimedia Modeling, Nov. 17-20, 1997, Singapore, pp. 89-109, XP002518297, Multimedia Modeling. Modeling Multimedia Information and Systems World Scientific Singapore.

U.S. Patent Office Action dated Nov. 14, 2006 in U.S. Appl. No. 10/919,238.

U.S. Patent Office Action dated Jul. 16, 2007 in U.S. Appl. No. 10/919,238.

U.S. Patent Office Action dated Mar. 26, 2008 in U.S. Appl. No. 10/919,238.

European Office Action dated Oct. 9, 2012 in corresponding European Patent Application No. 04019387.2.

MinYong Jeon et al., "A System-On-Chip Featuring Variable Bus Architecture and Enhanced Video Coprocessors for MPEG-4 Multimedia Applications", ISCAS 2003. International Symposium on Circuits and Systems May 25-28, 2003.

European Office Action dated Nov. 3, 2010 in corresponding European Patent Application No. 04019387.2.

European Office Action dated Jan. 22, 2013 in corresponding European Patent Application No. 04019387.2.

Kazuhito Suguri et al., "A Real-Time Motion Estimation and Compensation LSI with Wide Search Range for MPEG2 Video Encoding" IEEE Journal of Solid-State Circuits, IEEE Service Center, Piscataway, NJ, US, vol. 31, No. 11, Nov. 1, 1996.

\* cited by examiner aa bb cc dd ee ff gg hh

Fig. 17  PRIOR ART

SIGNAL-PROCESSING APPARATUS INCLUDING A SECOND PROCESSOR THAT, AFTER RECEIVING AN INSTRUCTION FROM A FIRST PROCESSOR, INDEPENDANTLY CONTROLS A SECOND DATA PROCESSING UNIT WITHOUT FURTHER INSTRCUCTION FROM THE FIRST PROCESSOR

This application is a divisional application of Ser. No. 10/919,238, filed Aug. 17, 2004 now abandoned.

BACKGROUND OF THE INVENTION

1. Field of the Invention

The present invention relates to a signal-processing apparatus that performs audio and image compression/decompression at high speed by use of a parallel processor and dedicated hardware, and an electronic apparatus using the same.

2. Description of the Related Art

In response to the recent trend toward higher performance and downsizing of image processing apparatuses and image display apparatuses that handle moving images, the ISO (International Organization for Standardization) and the ITU-T (International Telecommunication Union-Telecommunication Standardization Sector) are co-planning the standardization of MPEG-4 AVC (Advanced Video Coding) as a next-generation compression and decompression technology. The MPEG-4 AVC realizes a high image compression rate by introducing new technologies such as integer conversion of 4×4 pixels, intra prediction at up to nine directions, seven kinds of sub-macro-block types, up to 16 motion vectors per macro-block, multi-frame reference, a de-blocking filter in the loop and arithmetic coding, and aims at a code amount compressed to 50% of the MPEG-2 that has already been put into practical use.

However, the newly introduced coding tools adopt algorithms attaching importance to the coding efficiently; therefore, the processing amount is large and mounting to the built-in system is difficult.

For a prior signal-processing apparatus that performs compression and decompression with the encoding method, parallel processing by the processor and the a dedicated hardware structure have been used.

An example of the speed-enhanced signal processing using the parallel processing method by a processor is Document 1 (Japanese Patent Application No. H03-508269). The example shown in Document 1 is a parallel processor comprising a combination of a parallel data processor of the SIMD (Single Instruction Multiple Data) type in which the number of control streams is one and the number of data streams to be processed is more than one and a parallel data processor of the MIMD (Multiple Instruction Multiple Data) type in which the number of control streams and the number of data streams are both more than one.

FIG. 16, which is referred from FIG. 1 of Document 1, is a block diagram illustrating a signal-processing apparatus combining a prior SIMD parallel data processor 902 and an MIMD parallel data processor 903.

The signal-processing apparatus comprises a system controller 901 that controls the entire processor, the SIMD parallel data processor 902, the MIMD parallel data processor 903, a shared memory bus 904 and a shared memory 905.

The system controller 901 performs execution of application programs.

The SIMD parallel data processor 902 comprises an overall controller 910, calculators 911 to 914 and local memories 915 to 918 respectively. One calculator and one local memory constitute one processor. The overall controller 910 executes the program, and issues the same instruction to all of the calculators 911 to 914. The calculators 911 to 914 process data stored in local memories 915 to 918 respectively based on the same issued instruction.

The MIMD parallel data processor 903 comprises an overall controller 920, controllers 921 to 924, calculators 925 to 928 and local memories 929 and 932. One controller, one calculator and one local memory constitute one processor. A different program is executed by each of the controllers 921 to 924, a different instruction is issued to each of the calculators 925 to 928, and the data stored in each of the local memories 929 to 932 is processed. The overall controller 920 performs control for synchronization and monitoring of the entire MIMD parallel data processor 903.

In the parallel data processor as described above, when the object processing is simple and the data processing amount is large, the SIMD parallel data processor 902 performs processing, whereas when the object processing is complicated and the data processing amount is small, the MIMD parallel data processor 903 performs processing.

On the other hand, the speed enhancing method, which improves the calculation, is used by forming the most suitable calculator for the processing that is objected with the dedicated hardware. As an example thereof, Document 2 (Japanese Patent Application No. 2000-118434) discloses a technology that realizes a speedup of the processing by performing the variable-length encoding/decoding of the image processing with the dedicated hardware.

Figure 17:
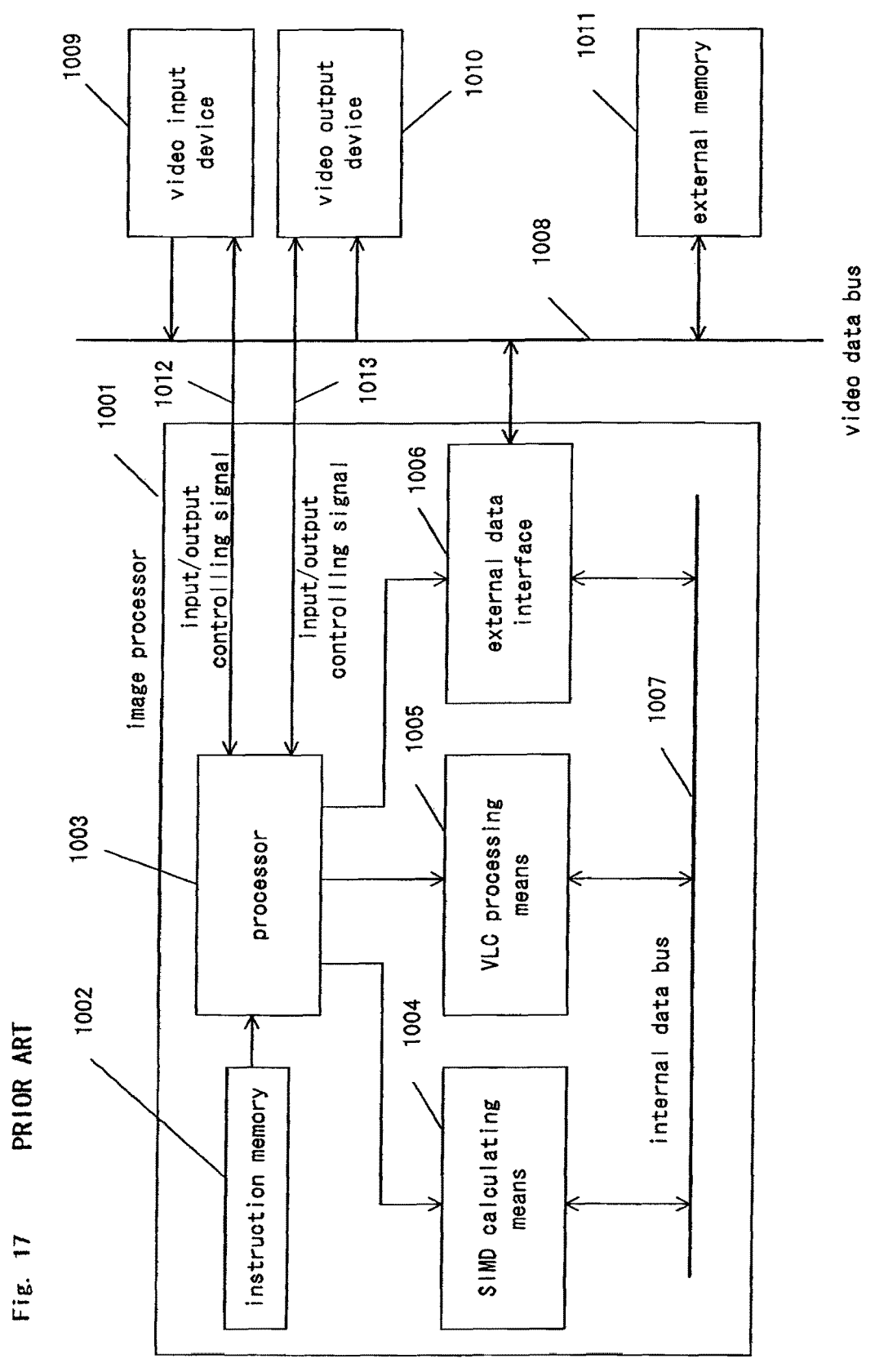

FIG. 17, which is referred from FIG. 1 of Document 2, is a block diagram illustrating an image processor 1001 combining the prior SIMD parallel data processor and the dedicated hardware.

The image processor 1001 is connected to an external video input device 1009, a video output device 1010 and an external memory 1011 through an external video data bus 1008. The image processor 1001 comprises an instruction memory 1002, a processor 1003, SIMD calculating means 1004, VLC (Variable-Length Coding) processing means 1005, an external data interface 1006, and an internal data bus 1007. The VLC processing means 1005 comprises the dedicated hardware.

The processor 1003 performs scalar operations, bit manipulation the issuance of comparison and branch instructions, and decodes the instruction held by the instruction memory 1002. The processor 1003 also controls the SIMD calculating means 1004, the VLC processing means 1005, the external data interface 1006, the video input device 1009 and the video output device 1010.

The video input device 1009 inputs the video signals from the outside, and the video output device 1010 outputs the video data to the outside.

The image data inputted by the video input device 1009 is transferred to the external memory 1011, and at the next step, is transferred to the external data interface 1006 according to the processing performed by the SIMD calculating means 1004. The SIMD calculating means 1004 performs motion compensation, DCT and quantization processing, and acquires transformed coefficient data. At the next step, in the VLC conversion means 1005, the transformed coefficient data is encoded in variable-length encoding by the VLC transforming means, and the bit stream is generated.

The SIMD calculating means 1004, which comprises eight parallel pipeline calculators, is capable of efficiently performing routine processing such as DCT.

The signal-processing apparatus comprising a combination of the SIMD data-parallel processor and the MIMD data-parallel processor is typified by the above-described Document 1, and is flexible for various coding algorithms. Thus, the signal-processing apparatus can sufficiently handle image processing by enhancing the degree of parallelism. This is because the prior motion detection processing is for macro-block sizes of not less than 8×8 pels and not more than 16×16 pels.

However, according to the MPEG-4 AVC, since the smallest sub-macro-block size is 4×4 pels, with the prior signal-processing apparatus, the processing efficiency of the calculators does not improve even if 16 or more parallel calculators are provided.

Moreover, in the arithmetic coding/decoding processing of the MPEG-4 AVC, since the processing is performed while the probability of occurrence is changed in accordance with the contexts of peripheral macro-blocks, it is necessary to perform coding bit-by-bit, which means the parallel processing cannot be performed. That is, with the prior signal-processing apparatus, the processing performance in the MPEG-4 AVC cannot be improved even if the degree of parallelism of the MIMD parallel data processor is enhanced.

In de-blocking filters of the MPEG-4 AVC, the filter parameter is calculated in the unit of sub-macro-blocks of 4×4 pels, and filtering processing is performed based on the result. When an SIMD calculator is used, although filtering processing can be performed in parallel, the calculators cannot be effectively used in determination processing.

Moreover, the signal-processing apparatus comprising a combination of the SIMD data-parallel processor and the dedicated hardware is typified by the above-described Document 2. Although the processing performance is improved by adopting the dedicated hardware for the arithmetic coding/decoding processing that requires high processing performance, performing motion detection with the largest processing amount by the SIMD parallel data processor causes the following problem.

In the MPEG-4 AVC, motion compensation of ¼ pixel precision is introduced, and it is necessary to perform 6-tap filtering processing for the pixel generation of a half pel. Further, since the sub-macro-block size of 4×4 pels is introduced, up to 16 motion vectors per macro-block can be set. The motion detection processing in which with the small sub-macro-block size, a search of ¼ pixel precision is performed and up to 16 motion vectors per macro-block are calculated is drastically increased in processing amount.

For the SIMD data-parallel processor to perform such motion detection processing, it is necessary to enhance the degree of parallelism of the calculators and set the operating frequency to a high value. The capability of the SIMD parallel data processor, is then more than required in the decoding processing; therefore, the entire processor can not be efficiently used.

Furthermore, even if it is attempted to improve the processing performance by enhancing the degree of parallelism of the SIMD parallel data processor, since the block size is 4×4 pels, it is impossible for the degree of parallelism to be more than 16.

OBJECTS AND SUMMARY OF THE INVENTION

An object of the present invention is to provide a signal-processing apparatus capable of performing high-performance and high-efficiency image processing for image processing requiring a large data processing amount like the coding/decoding processing of the MPEG-4 AVC, and an electronic apparatus using the same.

A first aspect of the present invention provides a signal-processing apparatus comprising: an instruction-parallel processor; a data-parallel processor; and a plurality of pieces of dedicated hardware, wherein the instruction-parallel processor performs audio compression/decompression and non-routine or less-heavy operation of image compression/decompression. The data-parallel processor performs, of the image compression/decompression and routine or heavy operation. The plurality of pieces of dedicated hardware perform, of the image compression/decompression, comparatively heavy processing.

According to the present structure, the signal-processing apparatus is composed of the instruction-parallel processor, the data-parallel processor and the dedicated hardware. The instruction-parallel processor performs non-routine processing of the audio compression/decompression and the image processing, the data-parallel processor performs the routine processing of the image processing, and the dedicated hardware performs processing such as motion detection, variable-length encoding, and de-blocking filtering processing. Consequently, for signal processing of an image compression and decompression algorithm with a large processing amount, the load is distributed between software and hardware, so that a signal-processing apparatus having high processing capability and flexibility can be realized.

A second aspect of the present invention provides a signal-processing apparatus according to the first aspect of the present invention, further comprising: a first instruction bus; a first data bus; a first shared memory; and an input and output interface. Each of the instruction-parallel processor, the data-parallel processor, the plurality of pieces of dedicated hardware and the input and output interface comprises a local memory. The instruction-parallel processor, the data-parallel processor and the plurality of pieces of dedicated hardware are connected to the first instruction bus. An instruction for the instruction-parallel processor to control the data-parallel processor and the plurality of hardware is communicated through the first instruction bus. The local memory of the instruction-parallel data processor, the local memory of the data-parallel processor, the local memories of the plurality of pieces of dedicated hardware, the first shared memory and the local memory of the input and output interface are connected to the first data bus, and data transfer is performed among these memories.

According to the present structure, in addition to the characteristics of the signal-processing apparatus in the first aspect of the present invention, the bus traffic is distributed by separating the instruction bus and the data bus. In this way, the processing performance can be improved.

A third aspect of the present invention provides a signal-processing apparatus according to the second aspect of the present invention, further comprising: a second data bus; a second shared memory; and a bridge unit connecting the first data bus and the second data bus. The local memory of the data-parallel processor, the local memories of the plurality of pieces of dedicated hardware, the first shared memory and the local memory of the input and output interface are connected to the first data bus, and data transfer is performed among these memories. The local memory of the instruction-parallel processor and the second shared memory are connected to the second data bus, and data transfer is performed between these memories. Data transfer between the memories connected to the first data bus and the memories connected to the second data bus is performed through the bridge unit.

According to the present structure, the local memory of the data processor, the dedicated memory of the dedicated hardware and the shared memory are connected by the first data bus, and the local memory of the instruction-parallel processor and the shared memory are connected by the second data bus. With this, the data transfer in image processing handling a large amount of data is performed mainly through the first data bus, so that the load can be shared with the second data bus to which the instruction-parallel processor performing audio processing is connected.

A fourth aspect of the present invention provides a signal-processing apparatus according to the third aspect of the present invention, further comprising a control processor, wherein the instruction-parallel processor controls the data-parallel processor and the plurality of pieces of dedicated hardware through the control processor.

According to the present structure, since the instruction-parallel processor is capable of controlling the data-parallel processor and the dedicated hardware through the control processor, the load is distributed between the instruction-parallel processor and the control processor; therefore, higher processing performance can be realized.

A fifth aspect of the present invention provides a signal-processing apparatus according to the fourth aspect of the present invention, further comprising a second instruction bus, wherein the instruction-parallel processor, the control processor and a part of the plurality of pieces of dedicated hardware are connected to the first instruction bus. The control processor, the data-parallel processor and the remainder of the plurality of pieces of dedicated hardware, the remainder being not connected to the first instruction bus, are connected to the second instruction bus. The instruction-parallel processor controls the part of the plurality of pieces of dedicated hardware, and controls, through the control processor, the data-parallel processor and the remainder of the plurality of pieces of hardware.

According to the present structure, since the instruction-parallel processor needs to control only the control processor and part of the dedicated hardware through the first instruction bus, and the data-parallel processor that performs routine processing and the dedicated hardware are controlled by the control processor through the second instruction bus, instruction confliction of the instruction bus can be avoided; therefore, signal processing can be performed with efficiency.

A sixth aspect of the present invention provides a signal-processing apparatus according to the first aspect of the present invention, wherein the data-parallel processor comprises a plurality of processing units, and wherein a number of the plurality of processing units of the data-parallel processor is determined according to a compressed or decompressed image size.

According to the present structure, since the degree of parallelism of the data-parallel processor is changed according to the size of the image which is the object of compression and decompression, a signal-processing apparatus capable of handling various image sizes with the same processor architecture can be provided.

A seventh aspect of the present invention provides a signal-processing apparatus according to the first aspect of the present invention, wherein the data-parallel processor comprises a plurality of processing units. A number of the plurality of processing units of the data-parallel processor is determined according to at least one of a power supply voltage and an operating frequency.

According to the present structure, the degree of parallelism of the data-parallel processor can be changed according to the power supply voltage and the operating frequency shared with LSIs. The operation frequency is reduced by increasing the degree of parallelism of the data parallel processing and the power consumption of the signal processing can be decreased; therefore, applications to electronic apparatuses such as mobile terminals particularly effective.

An eighth aspect of the present invention provides a signal-processing apparatus according to the first aspect of the present invention, wherein processing performed by the plurality of pieces of dedicated hardware includes at least one of variable-length coding processing, variable-length decoding processing, video input and output processing, motion detection processing, motion compensation processing, DCT (discrete cosine transform) processing, inverse DCT processing, quantization processing, inverse quantization processing and de-blocking filtering processing.

According to the present structure, in the compressing/decompressing processing, increase of the motion frequency for the instruction-parallel processor and the data-parallel processor can be controlled by processing the heavy modules of the processing amount such as motion detection, variable-length encoding/decoding, and de-blocking filter by the dedicated hardware.

A ninth aspect of the present invention provides a signal-processing apparatus according to the fifth aspect of the present invention, wherein the processing performed by the part of the plurality of pieces of dedicated hardware connected to the first instruction bus is variable-length coding processing and/or variable-length decoding processing.

According to the present structure, the dedicated hardware performing variable-length encoding and/or decoding can be directly and frequently controlled by the instruction-parallel processor. Consequently, the variable-length encoding and/or decoding can be finely and diversely controlled.

A tenth aspect of the present invention provides an electronic apparatus comprising a signal-processing apparatus, the signal-processing apparatus comprising: an instruction-parallel processor; a data-parallel processor; and a plurality of pieces of dedicated hardware. The instruction-parallel processor performs audio compression/decompression and non-routine or less-heavy operation of image compression/decompression, and the data-parallel processor performs, of the image compression/decompression, routine or heavy operation. The plurality of pieces of dedicated hardware perform, of the image compression/decompression, comparatively heavy processing, and the signal-processing apparatus performs at least one of audio compression processing, audio decompression processing, image compression processing and image decompression processing.

According to the present structure, the electronic apparatus, which makes full use of the characteristics of the signal-processing apparatus, can be provided.

An eleventh aspect of the present invention provides an electronic apparatus according to the tenth aspect of the present invention, further comprising: a reproducer; a demodulator/error corrector; a memory; and a plurality of D/A converters. The reproducer reproduces modulated coded signals from a recording medium loaded therein. The demodulator/error corrector demodulates the modulated coded signals reproduced by the reproducer, error-corrects the demodulated signals, and outputs the error-corrected signals as coded data. The signal-processing apparatus decodes the coded data outputted by the demodulator/error corrector, and outputs the decoded data as video data and audio data. The memory stores data before decoding, during decoding and after decoding. The plurality of D/A converters D/A-convert the video data and the audio data outputted by the signal-processing apparatus, and output an analog video output and an analog audio output.

According to the present structure, coded data can be efficiently decoded at high speed, and a reproduction electronic apparatus with a low power consumption can be realized.

A twelfth aspect of the present invention provides an electronic apparatus according to the tenth aspect of the present invention, further comprising: a plurality of A/D converters; a memory; an error corrector/modulator; and a recorder. The plurality of A/D converters A/D-convert an inputted analog video input and analog audio input, and output video data and audio data. The signal-processing apparatus encodes the video data and the audio data outputted by the plurality of A/D converters, and outputs coded data. The memory stores data before encoding, during encoding and after encoding. The error corrector/modulator adds an error correcting code to the coded data encoded by the signal-processing apparatus, modulates the coded data, and outputs the modulated data as coded signals, and the recorder records the coded signals outputted by the error corrector/modulator onto a recording medium loaded therein.

According to the present structure, the AV signals can be efficiently encoded at high speed, and a recording electronic apparatus with low power consumption can be realized.

A thirteenth aspect of the present invention provides an electronic apparatus comprising the electronic apparatus according to the eleventh aspect of the present invention and the electronic apparatus according to the twelfth aspect of the present invention.

According to the present structure, the AV signals can be efficiently encoded/decoded at high speed, and a electronic apparatus with low power consumption, into which a recording function and a reproduction function are integrated, can be realized.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 17 is a block diagram of the prior image processor comprising the combination of the SIMD parallel data processor and the dedicated hardware.

DETAILED DESCRIPTION OF THE PREFERRED EMBODIMENTS

Hereinafter, embodiments of the present invention are described with reference to the accompanying drawings.

First Embodiment

Figure 1:
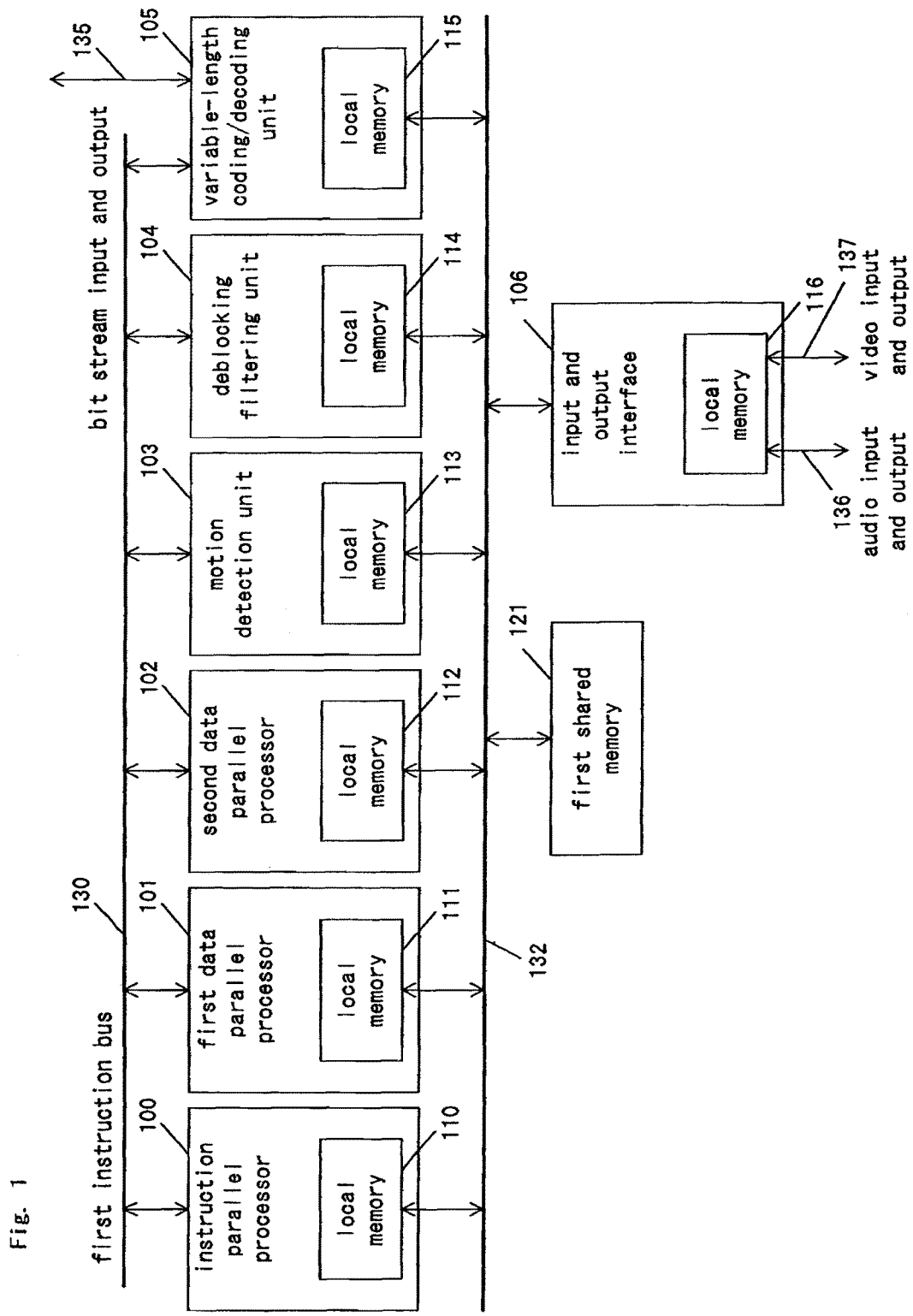
FIG. 1 is a block diagram of a signal-processing apparatus in a first embodiment of the present invention.

FIG. 1 is the block diagram of the signal-processing apparatus in the first embodiment of the present invention. The signal-processing apparatus of the present embodiment comprises: an instruction-parallel processor 100 having a local memory 110; a first data-parallel processor 101 having a local memory 111; a second data-parallel processor 102 having a local memory 112; a motion detection unit 103 having a local memory 113; a de-blocking filtering unit 104 having a local memory 114; a variable-length coding/decoding unit 105 having a local memory 115; an input and output interface 106 having a local memory 116; a first shared memory 121; a first instruction bus 130; and a first data bus 132. The processors 100 to 102 and the units 103 to 105 are connected to the first instruction bus 130, and the local memories 110 to 116, the first shared memory 121 and the input and output interface 106 are connected to the first data bus 132. The variable-length coding/decoding unit 105 further has a bit stream input and output 135 for external apparatuses, and the input and output interface 106 has an audio input and output 136 and a video input and output 137 for external apparatuses.

The SIMD processor adopted as the first data-parallel processor 101 and the second data-parallel processor 102 include eight processing elements, and are capable of processing eight data streams in parallel at one instruction.

The motion detection unit 103, the de-blocking filtering unit 104, the variable-length coding/decoding unit 105 and the input and output interface 106 are each dedicated hardware.

Next, the operation of the present embodiment will be described in outline with image coding processing as an example.

After an externally inputted video signal is A/D converted, the signal is stored in the first shared memory 121 from the input and output interface 106 via the first data bus 132.

The motion detection unit 103 calculates the motion vector based on the image data of the previous frame stored in the first shared memory 121 and the image data of the present frame.

The first data-parallel processor 101 calculates the prediction image data by performing motion compensation processing based on the image data of the previous frame stored in the first shared memory 121 and the motion vector calculated by the motion detection unit 103. Moreover, difference image data of the image data of the current frame with respect to the predicted image data is calculated.

The second data-parallel processor 102 discrete-cosine-transforms the difference image data, and quantizes the obtained DCT coefficient. Moreover, the second data-parallel processor 102 inversely quantizes the quantized DCT coefficient, inversely discrete-cosine-transforms it, calculates the difference image data, and calculates reconstructed image data from the difference image data and the predicted image data processed by the first data-parallel processor 101.

In the signal-processing apparatus of the present embodiment, while the first data-parallel processor 101 is performing the calculation of the pixel value of the motion compensation processing, the second data-parallel processor 102 performs the DCT processing. As described above, it is possible to cause two different data-parallel processors to perform different processing while maintaining the operating ratios thereof, whereby the performance is improved.

The de-blocking filtering unit 104 performs de-blocking filtering processing to the reconstructing image data, removes block noise, and stores it into the first shared memory 121.

The variable-length coding/decoding unit 105 performs variable-length coding processing using an arithmetic code on the quantized DCT coefficient and the motion vector, and outputs the coded data as a bit stream.

The instruction-parallel processor 100 performs the overall control of the above-described various processing through the first instruction bus 130. Moreover, the instruction-parallel processor 100 performs a coding mode determination as to whether to perform the generation of the predicted image by intra prediction coding or by inter prediction coding.

The data transfer between the processors and the units is performed through the first data bus 132.

High-efficiency image processing can be realized by performing sequential processing of the image compression/decompression by the instruction-parallel processor 100, performing routine processing of the image compression/decompression by the first data-parallel processor 101 and the second data-parallel processor 102, and performing heavy processing such as the motion detection processing, the de-blocking filtering processing and the variable-length coding processing by the dedicated hardware as described above.

The demarcation in sharing the object of processing between the first data-parallel processor 101 and the second data-parallel processor 102 in the present embodiment is an example, and it may be different. In other words, according to the performance of the processor, the processing of the first data-parallel processor 101 and the second data-parallel processor 102 may be performed by one data-parallel processor.

Further, the motion compensation processing performed by the first data-parallel processor 101 may be performed by the motion detection unit 103.

Second Embodiment

Figure 2:
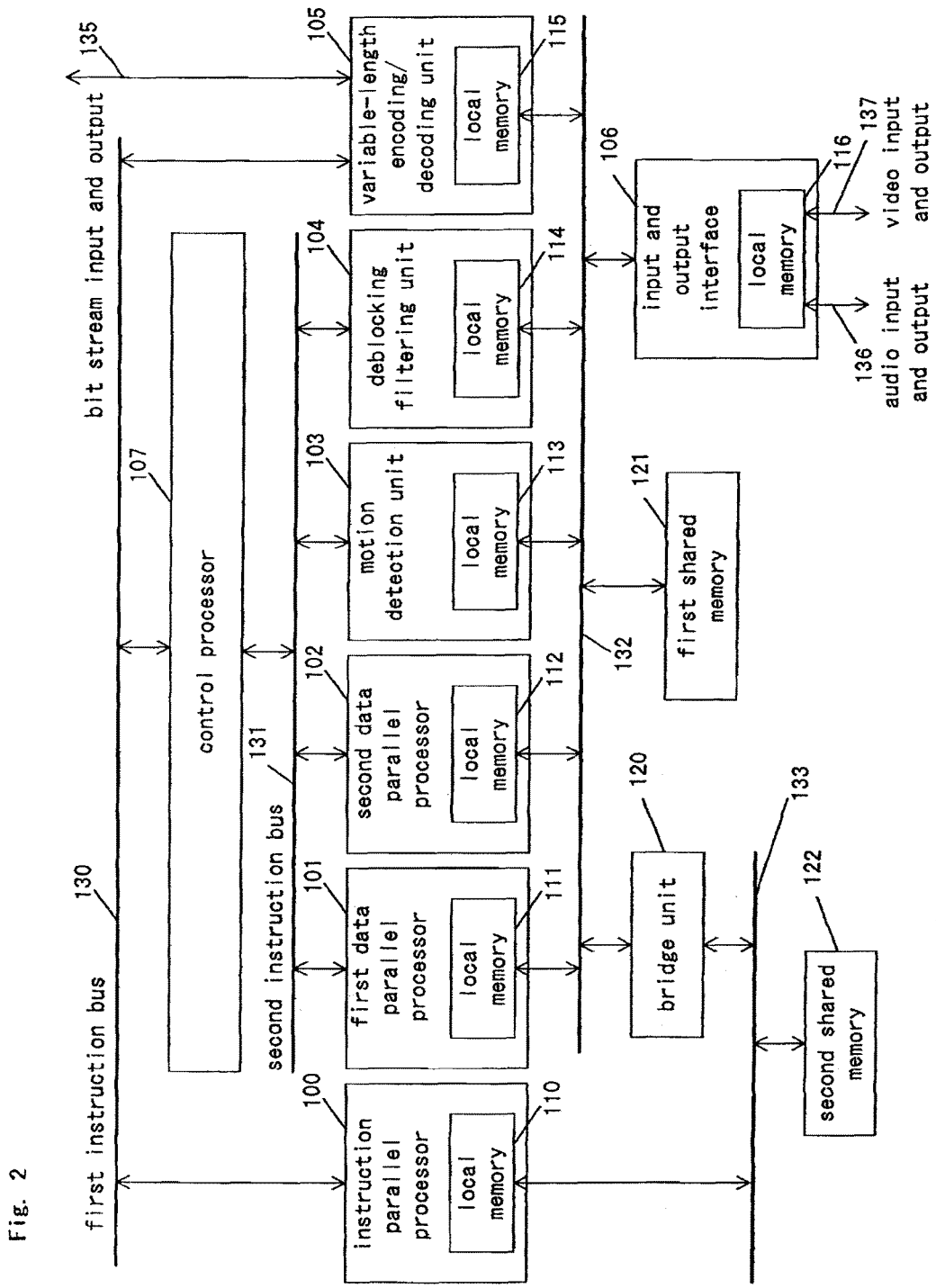
FIG. 2 is a block diagram of a signal-processing apparatus in a second embodiment of the present invention.

FIG. 2 is the block diagram of the signal-processing apparatus in the second embodiment of the present invention. In FIG. 2, components similar to those of FIG. 1 are denoted by the same reference numerals, and descriptions thereof are omitted.

The signal-processing apparatus of the present embodiment further comprises, compared to the signal-processing apparatus of the first embodiment, a control processor 107, a second shared memory 122, a second instruction bus 131, a second data bus 133, and a bridge unit 120 connecting the first data bus 132 and the second data bus 133.

The instruction-parallel processor 100, the control processor 107 and the variable-length coding/decoding unit 105 are connected to the first instruction bus 130. The control processor 107, the first data-parallel processor 101, the second data-parallel processor 102, the motion detection unit 103 and the de-blocking filtering unit 104 are connected to the second instruction bus 131.

The local memories 111 to 115, the first shared memory 121, the input and output interface 106 and the bridge unit 120 are connected to the first data bus. The local memory 110, the second shared memory 122 and the bridge unit 120 are connected to the second data bus.

In the signal-processing apparatus of the present embodiment, the parallel processing of data is enhanced compared to that of the first embodiment. In other word, the control processor 107 introduced in the present embodiment controls, in response to an instruction from the instruction-parallel processor 100, the first data-parallel processor 101, the second data-parallel processor 102, the motion detection unit 103 and the de-blocking filtering unit 104 through the second instruction bus 131. Consequently, the signal-processing apparatus of the present embodiment is capable of more rapidly performing parallel processing by the data-parallel processors and the dedicated hardware.

Further, the second shared memory 122 of the present embodiment stores data related to the instruction-parallel processor 100, and data accessed at a comparatively low frequency among the data handled by the components connected to the first data bus 132. The structure reduces the load on the first shared memory 121, so that the processing efficiency of the entire signal-processing apparatus is improved.

The operation of the present embodiment will be described in detail in the third embodiment described below.

Third Embodiment

Figure 3:
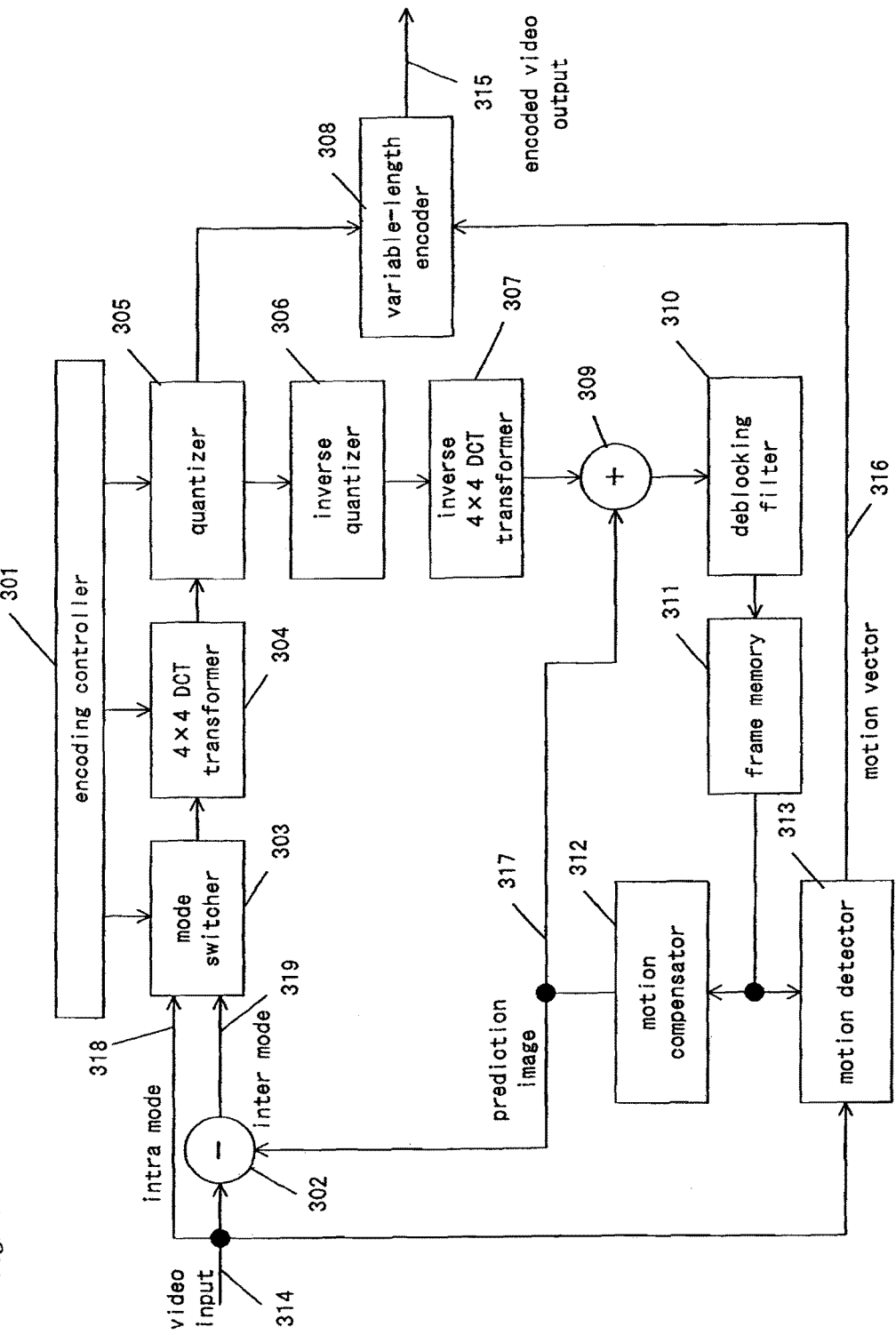
FIG. 3 is a block diagram of a video encoder in a third embodiment of the present invention.

FIG. 3 is the block diagram showing a video encoder in the third embodiment of the present invention.

The video encoder of the present embodiment is an encoder capable of the MPEG-4 AVC. Each component is given a name adequately expressing a function of the video encoder corresponding to the MPEG-4 AVC.

The video encoder of the present embodiment shown in FIG. 3 comprises the signal-processing apparatus of the second embodiment. Therefore, the correspondence between the components of FIG. 3 and the components of FIG. 2 will be shown first.

The processing of a coding controller 301 and a mode switcher 303 are performed by the instruction-parallel processor 100 of FIG. 2.

The processing of a motion compensator 312 and a difference detector 302 are performed by the first data-parallel processor 101 of FIG. 2.

The processing of a 4×4 DCT transformer 304, a quantizer 305, an inverse quantizer 306, an inverse 4×4 DCT transformer 307 and a reconstructor 309 are performed by the second data-parallel processor 102 of FIG. 2.

A variable-length coder 308 corresponds to the variable-length coding/decoding unit 105 of FIG. 2. A de-blocking filter 310 corresponds to the de-blocking filtering unit 104 of FIG. 2. A frame memory 311 corresponds to the first shared memory 121 of FIG. 2, and a motion detector 313 corresponds to the motion detection unit 103 of FIG. 2.

Next, primary signal processing of the MPEG-4 AVC will be described with reference to the operation of the components of the present embodiment.

First, encoding processing will be described with reference to FIG. 3. A video input 314 is, in the case of intra coding, discrete-cosine-transformed (orthogonally transformed) by the 4×4 DCT transformer 304 to obtain the DCT coefficient. Then, the DCT coefficient is quantized by the quantizer 305.

According to existing coding standards such as the MPEG-2 and the H.263, a real-precision DCT is adopted for the 8×8 block size, and a mismatch occurs unless the DCT precision is defined. However, according to the MPEG-4 AVC, an integral-precision DCT is applied for the 4×4 block size, and consequently, a mismatch due to the DCT precision does not occur.

The quantized DCT coefficient is entropy-coded by use of an arithmetic coder at the variable-length coder 308. Details thereof will be described later.

Next, variable-length coding/decoding processing will be described.

The outline of the MPEG-4 AVC is described in Document 3 "The overview of MPEG-4 AVC|H.264 and its standardization" (Teruaki SUZUKI, Information Processing Society of Japan, Audio Visual and Multimedia Information Processing 38-13, pp. 69-73, November, 2002). Description will be given based on Document 3.

In the variable-length coding of syntax elements such as the number of macro-blocks, the motion vector difference and the conversion factor, the following two entropy coding methods are selectively used: CAVLC (Context Adaptive Variable Length Coding); and CABAC (Context Adaptive Binary Arithmetic Coding).

In this description, an arithmetic coding method called CABAC used in the main profile will be explained. In the arithmetic coding, a line segment with a length of "1" is divided according to the probability of occurrence of the symbol to be coded, and since the divided line segment and the symbol to be coded correspond one to one to each other, coding is performed with respect to the line segment. Since the binary number representative of the line segment is a code, the segment of the line is large, that is, the higher the probability of occurrence of the symbol to be coded is, the shorter the binary number the symbol can be expressed by and consequently, the compression rate is increased. Therefore, when coding of the object block is performed, the probability of occurrence is manipulated in accordance with the context of the peripheral block so that the compression rate is increased.

Figure 4:
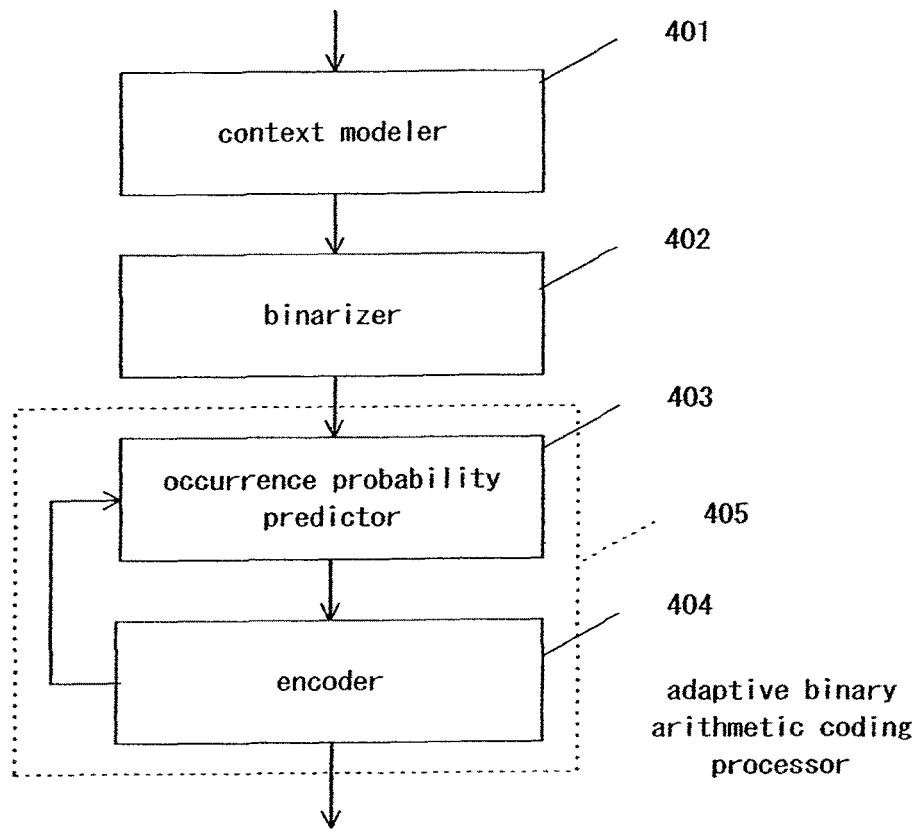
FIG. 4 is a block diagram of a CABAC (Context Adaptive Binary Arithmetic Coding) arithmetic coding unit.

FIG. 4 is a block diagram of a CABAC arithmetic coding unit. This is referred from FIG. 7 of Document 3. The CABAC arithmetic coding unit shown in FIG. 4 has a context modeler 401, a binarizer 402 and an adaptive binary arithmetic coding processor 405. The adaptive binary arithmetic coding processor 405 has an occurrence probability predictor 403 and a coder 404.

The context modeling is a probability model when each symbol is coded. A context is defined for each syntax element, and arithmetic coding is performed by switching the probability table in accordance with the context.

Figure 5:
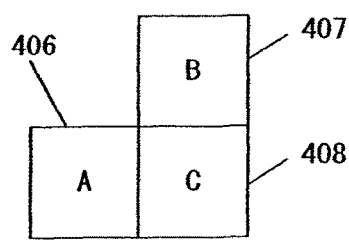
FIG. 5 shows the layout of a coding object block and adjacent blocks.

FIG. 5 shows the layout of the coding object block and adjacent blocks. In FIG. 5, when a coding object block C408 is coded, the context of the coding object block C408 is determined in accordance with the condition of adjacent blocks A406 and B407.

In the above-described arithmetic coding processing, the decoding processing of the variable-length-coded code is a sequential processing of analyzing occurrence probability information by a decoder and performing reconstruction based on the information. Moreover, since the manipulation of the probability of occurrence is performed by use of a table, performing these coding processing and decoding processing by use of a VLIW (Very Long Instruction Word)-compliant instruction-parallel processor (in the above-described second embodiment, corresponding to the instruction-parallel processor 100 shown in FIG. 2) or an SIMD data-parallel processor (similarly, corresponding to the first data-parallel processor 101 or the second data-parallel processor 102) does not improve the processing performance. Rather, by performing these processing's by use of dedicated hardware (similarly, corresponding to the variable-length coding/decoding unit 105), the load can be distributed between the instruction-parallel processor and the data-parallel processor. Consequently, the operating frequency is reduced, so that the frequency balance of the processor can be made excellent. This is why the variable-length coder 308 shown in FIG. 3 is processed by the variable-length coding/decoding unit 105 shown in FIG. 2, which is dedicated hardware in the present embodiment.

In FIG. 3, the DCT coefficient quantized by the quantizer 305 is inversely quantized by the inverse quantizer 306 and is then inversely discrete-cosine-transformed by the inverse 4×4 DCT transformer 307, and the image is reconstructed by the reconstructor 309. On the reconstructed image, de-blocking filtering processing is performed by the de-blocking filter 310, and the pixel value is rewritten at the 4×4 pixel boundary. The de-blocking filtering processing will be described later.

Figure 6:
FIG. 6 explains how a motion compensation of ¼ pixel precision performs.
Figure 6:
Figure 6:
Figure 6:
Figure 6:
Figure 6:
Figure 6:
Figure 6:
Figure 6:
Figure 6:
Figure 6:
Figure 6:
Figure 6:
Figure 6:
Figure 6:
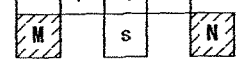
Figure 6:
Figure 6:
Figure 6:
Figure 6:
Figure 6:
Figure 6:
Figure 6:
Figure 6:
Figure 6:
Figure 6:
Figure 6:
Figure 6:
Figure 6:
Figure 6:
Figure 6:
Figure 6:
Figure 6:
Figure 6:

Next, the motion compensation processing of ¼ pixel precision performed by the motion compensator 312 of FIG. 3 will be described with reference to FIG. 6. FIG. 6 is an explanatory view for explaining the motion compensation of ¼ pixel precision.

Motion compensation is to construct a predicted image closer to the image to be coded, by use of information on the motion vector when a predicted image is constructed from an image referred to. Since the code amount decreases as the prediction error decreases, the MPEG-4 AVC adopts the motion compensation of ¼ pixel precision. The motion vector comprises two parameters representative of a translational movement in the unit of blocks (the distance moved in the horizontal direction and the distance moved in the vertical direction).

The predicted image of the reference image pointed by the motion vector is obtained by the following manner:

In FIG. 6, pixels A, B, C, D, E, F, G, H, I, J, K, L, M, N, P, Q, R, S, T and U are pixels in integral positions, pixels aa, bb, cc, dd, ee, ff, gg and hh and pixels b, h, j, m and s are pixels of ½ precision, and pixels a, c, d, e, f, g, i, k, n, p, q and r are pixels of ¼ precision.

The procedure of obtaining the values of these pixels is now described. First, the pixel b of ½ precision is obtained in the following manner: With the pixels E, F, G, H, I and J in the vicinity of the pixel b in the horizontal direction as variables, intermediate data b1 is generated by use of a 6-tap filter defined by (Equation 1).

$$b1=(E-5*F+20*G+20*H-5*I+J) \quad \text{[Equation 1]}$$

Then, the intermediate data b1 is rounded and normalized by (Equation 2) and clipped to 0 to 255, whereby the pixel b is obtained.

$$b=\text{Clip}((b1+16)/32) \quad \text{[Equation 2]}$$

Here, Clip(X) is a function that clips the variable X inside the parentheses to a range of 0 to 255. That is, when the variable X is less than 0, b=0, when the variable X is in the range of 0 to 255, b=X, and when the variable X is not less than 256, b=255.

Likewise, the pixel h of ½ precision is obtained in the following manner: With the pixels A, C, G, M, R and T in the vicinity of the pixel h in the vertical direction as variables, intermediate data h1 is generated by use of a 6-tap filter defined by (Equation 3).

$$h1=(A-5*C+20*G+20*M-5*R+T) \quad \text{[Equation 3]}$$

The intermediate data h1 is rounded and normalized by (Equation 4) and clipped to 0 to 255, whereby the pixel h is obtained.

$$h=\text{Clip}((h1+16)/32) \quad \text{[Equation 4]}$$

The pixels a, c, d, f, i, k, n and q of ¼ precision are each obtained by a rounded average by use of two neighboring pixels as shown in (Equation 5).

$$a=(G+b+1)/2$$
$$c=(H+b+1)/2$$
$$d=(G+h+1)/2$$
$$f=(b+j+1)/2$$
$$i=(h+j+1)/2$$
$$k=(j+m+1)/2$$
$$n=(M+h+1)/2$$
$$q=(j+s+1)/2 \quad \text{[Equation 5]}$$

Likewise, the pixels e, g, p and r of ¼ precision are each obtained by a rounded average by use of two neighboring pixels as shown in (Equation 6).

$$e=(b+h+1)/2$$
$$g=(b+m+1)/2$$
$$p=(h+s+1)/2$$
$$r=(m+s+1)/2 \quad \text{[Equation 6]}$$

In the predicted image generation as described above, the motion vector can be set for each sub-macro-block. In the case of 4×4 where the sub-macro-blocks are smallest, it is necessary to interpolate pixels in 16 real positions from the pixels in the integral positions by use of a 6-tap filter. In the pixel interpolation, since there is no data dependence among pixels, processing can be performed in parallel. Therefore, by using the SIMD data-parallel processor as shown in the present embodiment, filtering processing can be efficiently performed.

Next, the de-blocking filtering will be described.

According to the MPEG-4 AVC, since the DCT processing is performed in the unit of 4×4 pixels, block distortion occurs at the pixel boundary. The de-blocking filtering processing smoothes the distortion by performing filtering on the block boundary. The filtering processing performed on the 4×4 boundaries of the image is an adaptive filtering processing in which the filter strength is adjusted to a value most suitable for each block boundary in accordance with the value of the Boundary Strength (BS). That is, the boundary strength BS is used for determining whether to perform filtering on the boundary or not and defining the maximum value of pixel value variations when filtering is performed.

Figure 7:
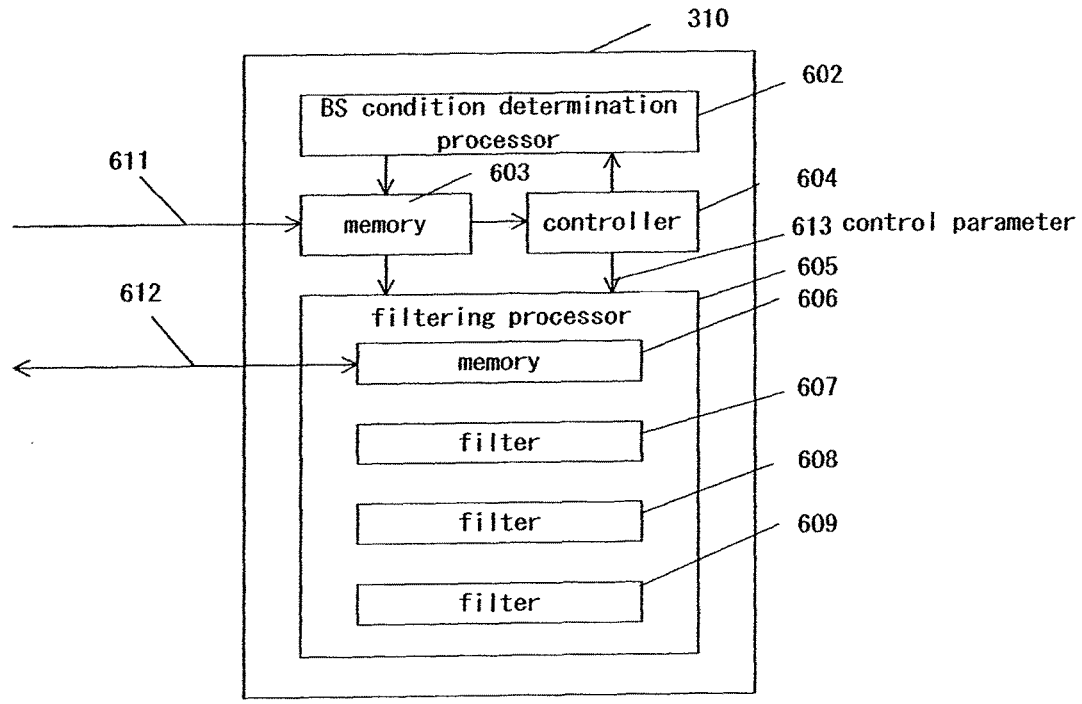
FIG. 7 is a block diagram of a de-blocking filter in the third embodiment of the present invention.

FIG. 7 is a block diagram of the de-blocking filter 310 according to the third embodiment of the present invention. The de-blocking filter 310 of the present embodiment comprises a BS condition determination processor 602, a memory 603, a controller 604 and a filtering processor 605. The filtering processor 605 comprises a memory 606 and filters 607 to 609.

In the de-blocking filter 310 shown in FIG. 7, the BS condition determination processor 602 calculates the boundary strength BS, determines the result, and passes a control parameter 613 to the filtering processor 605. The filtering processor 605 performs filtering processing in accordance with the control parameter 613.

The processing of the de-blocking filter 310 is now described with reference to FIG. 8.

Figure 8:
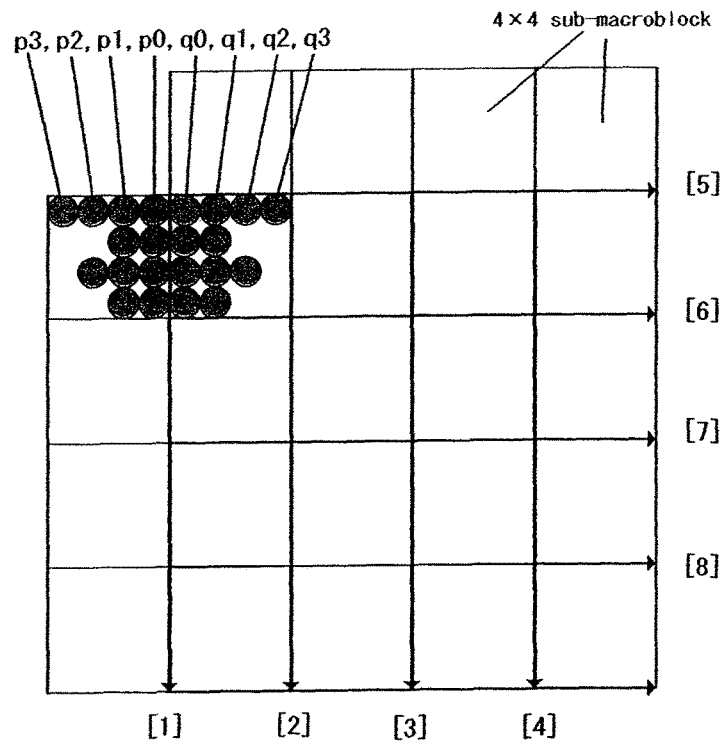
FIG. 8 explains how a processing sequence of the de-blocking filter performs.

FIG. 8 shows the processing sequence of the de-blocking filter 310 according to the third embodiment of the present invention. As the filtering processing, as shown in FIG. 8, horizontal filtering processing for boundaries [1] to [4] is performed, and then, vertical filtering processing for boundaries [5] to [8] is performed.

Filtering processing when the boundary strength BS=4 will be described. In the first filtering processing on the boundary [1] of a 4×4 sub-macro-block, with eight pixels p3, p2, p1, p0, q0, q1, q2 and q3 sandwiching the boundary [1] as the inputs, six pixels p2, p1, p0, q0, q1 and q2 are rewritten to pixels P2, P1, P0, Q0, Q1 and Q2.

The pixels P2, P1 and P0 are switched between filtering equations by the condition of (Equation 7), and are calculated by (Equation 8) or (Equation 9).

$$ap<\beta \text{ and } |p0-q0|<4\alpha+2$$

$$ap=|p2-p0| \quad \text{[Equation 7]}$$

α: coefficient 1 calculated from quantization parameter
β: coefficient 2 calculated from quantization parameter When the condition of (Equation 7) is satisfied, the pixels P0, P1 and P2 are obtained by (Equation 8).

$$P0=(p2+2*p1+2*p0+2*q0+q1+4)/8$$
$$P1=(p2+p1+p0+q0+2)/4$$
$$P2=(2*p3+3*p2+p1+p0+q0+4)/8 \quad \text{[Equation 8]}$$

When the condition of (Equation 7) is not satisfied, the pixels P0, P1 and P2 are obtained by (Equation 9).

$$P0=(2*p1+p0+q1+2)/4$$
$$P1=p1$$
$$P2=p2 \quad \text{[Equation 9]}$$

The pixels Q0, Q1 and Q2 are switched between filtering equations by the condition of (Equation 10), and are calculated by (Equation 11) or (Equation 12).

$$ap<\beta \text{ and } |p0-q0|<4\alpha+2$$

$$aq=|q2-q0| \quad \text{[Equation 10]}$$

α: coefficient 1 calculated from quantization parameter
β: coefficient 2 calculated from quantization parameter When the condition of (Equation 10) is satisfied, the pixels Q0, Q1 and Q2 are calculated by (Equation 11).

$$Q0=(p1+2*p0+2*q0+2*q1+q2+4)/8$$

$$Q1=(p0+q0+q1+q2+2)/4$$

$$Q2=(2*q3+3*q2+q1+q0+p0+4)/8 \quad \text{[Equation 11]}$$

When the condition of (Equation 10) is not satisfied, the pixels Q0, Q1 and Q2 are calculated by (Equation 12).

$$Q0=(2*q1+q0+p1+2)/4$$

$$Q1=q1$$

$$Q2=q2 \quad \text{[Equation 12]}$$

When the filtering processing is adaptively switched according to the quantization parameter and the pixel value as described above, with the data processor by the SIMD data-parallel processor, the BS condition determination cannot be performed in parallel, so that the calculators disposed in parallel cannot be effectively used. Instead, by performing the de-blocking filtering processing by dedicated hardware comprising the BS condition determination processor 602 and the filtering processor 605 as shown in FIG. 7, the BS calculation processing and the filtering processing can be separately performed and this speeds up the BS condition determination processing so that the filtering processing can be performed in parallel. Consequently, the de-blocking filtering processing can be efficiently performed. Further, since the brightness Y and the color difference UV are not dependent on data, the filter processor is capable of parallel operation, and the introduction of calculators can further reduce the number of processing cycles. This is why the de-blocking filter 310 shown in FIG. 3 is processed by the de-blocking filtering unit 104 shown in FIG. 2 which is dedicated hardware in the present embodiment.

The image having undergone the de-blocking filtering processing by the de-blocking filter 310 in the video encoder of the present embodiment shown in FIG. 3 is stored in the frame memory 311 because it is not only used as the output image but also is referred to as the reference image for the frame and succeeding frames.

Next, the processing amount required when the video encoder shown in FIG. 3 is implemented by the signal-processing apparatus of the present embodiment is compared with the processing amount required when it is implemented by a different method.

Figure 9:
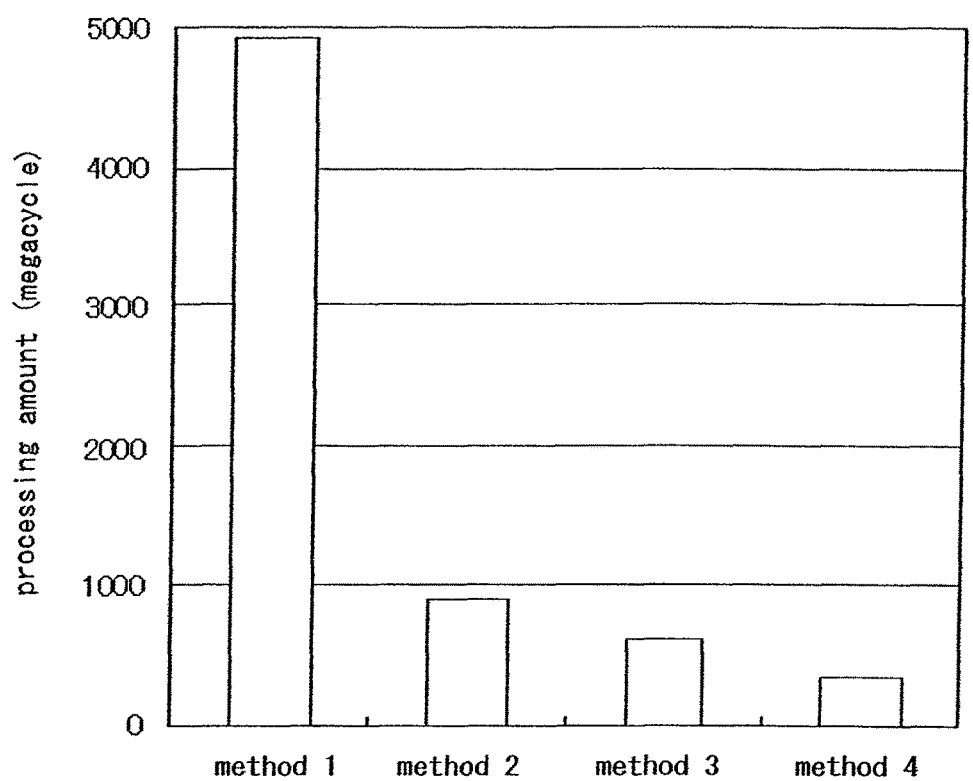
FIG. 9 shows a comparison of encoding processing amount between the third embodiment of the present invention and a different method.

FIG. 9 is a bar chart showing the comparison of the encoding processing amount between the third embodiment of the present invention and a different method.

In FIG. 9, a method 1 is a case where the video encoder shown in FIG. 3 is structured by use of a processor capable of issuing one instruction per clock cycle and all the processing is performed via software. A method 2 is a case where the video encoder shown in FIG. 3 is structured by a combination of an MIMD parallel data processor and an SIMD parallel data processor and all the processing is performed via software. A method 3 is a case where the video encoder shown in FIG. 3 is structured by use of an SIMD parallel data processor and dedicated VLC hardware. A method 4 is a case where the video encoder shown in FIG. 3 is structured by a VLIW parallel data processor, an SIMD parallel data processor and dedicated hardware, and corresponds to the present embodiment. That is, the VLIW parallel data processor of the method 4 corresponds to the instruction-parallel processor 100 of the present embodiment shown in FIG. 2, the SIMD parallel data processor of the method 4 corresponds to the first data-parallel processor 101 and the second data-parallel processor 102 of the present embodiment shown in FIG. 2, and the dedicated hardware of the method 4 corresponds to the motion detection unit 103, the de-blocking filtering unit 104 and the variable-length coding/decoding unit 105 of the present embodiment shown in FIG. 2.

In the encoding processing, the processing amount in the motion detection, the motion compensation, the variable-length coding and the de-blocking filtering is large. Concrete numerical values of these processing amounts among the methods are as follows:

In method 1, the motion detection processing is "3048" megacycles, the variable-length coding processing is "1000" megacycles, the de-blocking filtering processing is "321" megacycles, the motion compensation processing is "314" megacycles, and the remaining processing is "217" megacycles. The total processing amount is "4900" megacycles.

In method 2, the motion detection processing is "381" megacycles, the variable-length coding processing is "333" megacycles, the de-blocking filtering processing is "107" megacycles, the motion compensation processing is "39" megacycles, and the remaining processing is "52" megacycles. The total processing amount is "900" megacycles.

In method 3, the motion detection processing is "381" megacycles, the variable-length coding processing is "67" megacycles, the de-blocking filtering processing is "80" megacycles, the motion compensation processing is "39" megacycles, and the remaining processing is "30" megacycles. The total processing amount is "607" megacycles.

In the method 4, the motion detection processing "203" megacycles, the variable-length coding processing is "67" megacycles, the de-blocking filtering processing is "21" megacycles, the motion compensation processing is "21" megacycles, and the remaining processing is "29" megacycles. The total processing amount is "352" megacycles.

The motion detection processing is a process of selecting a position (motion vector) where the sum of the absolute values of the differences between the pixel values of the object macro-block and the reference macro-block is the smallest. In the case of the MPEG-4 AVC, the motion vector can be set in the unit of 4×4 sub-macro-blocks. Therefore, the calculation of the sum of the absolute values of the differences among 16 pixels can be processed in parallel. In the methods 2 and 3, the motion detection processing is performed by an 8-parallel SIMD parallel data processor, and compared to the method 1, a significant speedup is realized. In the method 4, since the motion detection processing is performed by 16-parallel dedicated hardware capable of calculating the sum of the absolute values of the differences, higher-speed processing than the SIMD parallel data processor is realized.

The motion compensation processing is a processing of obtaining the reference image pointed by the motion vector, with ¼ pixel precision. In this processing, parallel processing is also possible because processing is performed in the unit of 4×4 sub-macro-blocks. Like in the case of the motion detection processing, the motion compensation processing is performed by the 8-parallel SIMD parallel data processor in the methods 2 and 3 and by the dedicated hardware in the method 4, thereby a significant speedup is realized.

The variable-length coding processing which is an arithmetic coding processing called CABAC is a sequential processing of performing coding by changing the probability of occurrence of the object block in accordance with the context of the peripheral block. Method 2 is intended to perform the variable-length coding processing by using an MIMD parallel data processor capable of issuing four instructions, and the processing amount is, at most, ⅓ that of the one instruction issuing processor of the method 1. In methods 3 and 4, the VLC processing is performed by dedicated hardware, and since the determination processing and the table search processing are performed at high speed, the processing time can be reduced to ¹⁄₁₅ that of the method 1.

The de-blocking filtering processing is a parallel processing by the MIMD parallel data processor in method 2, and a parallel processing by the SIMD parallel data processor in method 3. Since the performance of the filtering processing and the performance of the BS determination processing are not improved in the MIMD type and the SIMD type, respectively, the processing time can be reduced only to ⅓ to ¼. On the other hand, in the method 4, the de-blocking filtering processing is performed by the dedicated hardware, and by dividing the BS determination processing and the filtering processing, and by pipeline operation, the processing time can be reduced to ¹⁄₁₅ that of the method 1.

As is apparent from the above, by implementing the motion detection processing, the motion compensation processing, the variable-length coding processing and the de-blocking filtering as dedicated hardware like in the present embodiment, a significant speedup is realized.

Fourth Embodiment

Figure 10:
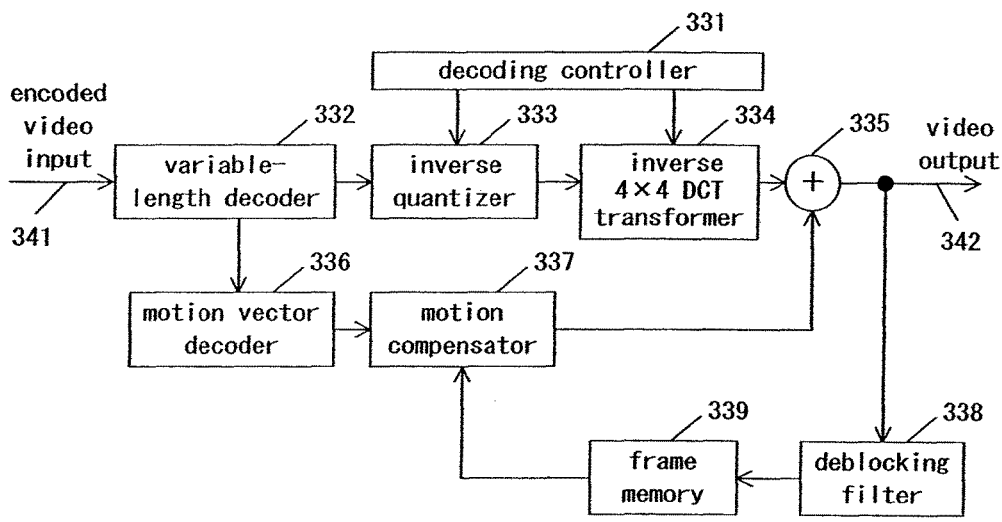
FIG. 10 is a block diagram of a video decoder in a fourth embodiment of the present invention.

FIG. 10 is a block diagram of a video decoder according to a fourth embodiment of the present invention.

The video decoder of the present embodiment is a decoder capable of the MPEG-4 AVC. Each component is given a name adequately expressing a function of the video decoder according to the MPEG-4 AVC.

The video decoder of the present embodiment shown in FIG. 10 comprises the signal-processing apparatus of the second embodiment. The correspondence between the components of FIG. 10 and the components of FIG. 2 is now shown.

The processing of a decoding controller 331 is performed by the instruction-parallel processor 100 of FIG. 2.

The processing of a motion vector decoder 336 and a motion compensator 337 are performed by the first data-parallel processor 101 of FIG. 2.

The processing of an inverse quantizer 333, an inverse 4×4 DCT transformer 334 and a reconstructor 335 are performed by the second data-parallel processor 102 of FIG. 2.

A variable-length decoder 332 corresponds to the variable-length encoding/decoding unit 105 of FIG. 2, a de-blocking filtering 338 corresponds to the de-blocking filtering unit 104 of FIG. 2, and a frame memory 339 corresponds to the first shared memory 121 of FIG. 2.

The outline of the operation of the video decoder of the present embodiment is now described.

An encoded video input 341 encoded by arithmetic encoding is inputted to the variable-length decoder 332 and decoded to obtain the quantized DCT coefficient and the motion vector difference. The obtained quantized DCT coefficient is inversely quantized by the inverse quantizer 333, and then, inversely discrete-cosine-transformed by the inverse 4×4 DCT transformer 334 to obtain the difference image data.

On the other hand, the motion vector is obtained by the motion vector decoder 336 from the motion vector difference obtained by the variable-length decoder 332, and the predicted image is obtained by the motion compensator 337 from the reference image and the motion vector stored in the frame memory 339.

A new image is reconstructed by the reconstructor 335 from the difference image data and the predicted image and outputted as a video output 342. The outputted video output 342 is, at the same time, de-blocking-filtering-processed by the de-blocking filter 338, and then, stored into the frame memory 339.

The control of the quantizer 333 and the inverse 4×4 DCT transformer 334 is performed by the decoding controller 331.

The de-blocking filtering processing, the inverse quantization processing and the inverse DCT processing are similar to those in the third embodiment, and descriptions thereof are omitted.

In the present embodiment, by performing the variable-length decoding processing and the de-blocking filtering processing with dedicated hardware, a significant speedup can be realized.

Moreover, while the above description takes up an example in which the video decoder of the present embodiment is implemented by use of the signal-processing apparatus of the second embodiment of the present invention shown in FIG. 2, the video decoder of the present embodiment can be realized by use of the signal-processing apparatus of the first embodiment of the present invention. Moreover, the processing object that each processor takes charge of can be changed as required.

Fifth Embodiment

Figure 11:
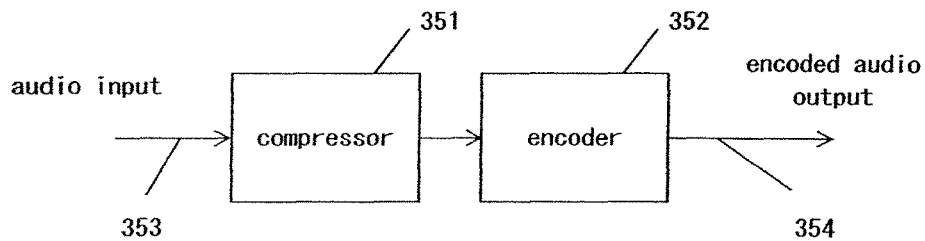
FIG. 11 is a block diagram of an audio encoder in a fifth embodiment of the present invention.
Figure 12:
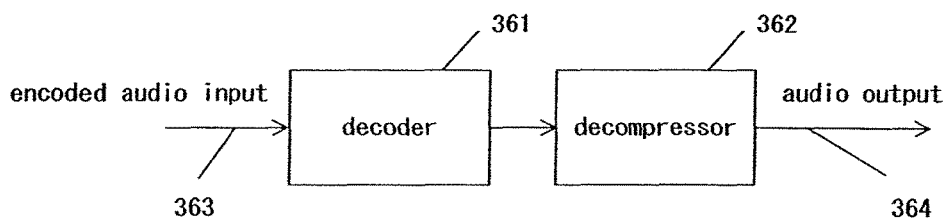
FIG. 12 is a block diagram of an audio decoder in the fifth embodiment of the present invention.

FIG. 11 is a block diagram of an audio encoder according to a fifth embodiment of the present invention. FIG. 12 is a block diagram of an audio decoder according to the fifth embodiment of the present invention.

In the audio encoder shown in FIG. 11, an audio input 353 undergoes compression processing including sampling and quantization at a compressor 351, undergoes encoding at a encoder 352, and is outputted as an encoded audio output 354.

In the audio decoder shown in FIG. 12, an encoded audio input 363 is decoded by a decoder 361, and is inversely quantized by a decompressor 362 to be decompressed.

Audio encoding and decoding can be processed by any processor because the required processing amount is small compared to that of video encoding and decoding according to the MPEG-4 AVC.

When the audio encoder and the audio decoder of the present embodiment are implemented by use of the signal-processing apparatus of the first embodiment, the processing of the compressor 351 and the coder 352 shown in FIG. 11 and the processing of the decoder 361 and the decompressor 362 shown in FIG. 12 are performed by the instruction-parallel processor 100 shown in FIG. 1. These processing can be performed with a sufficient margin.

Sixth Embodiment

Figure 13:
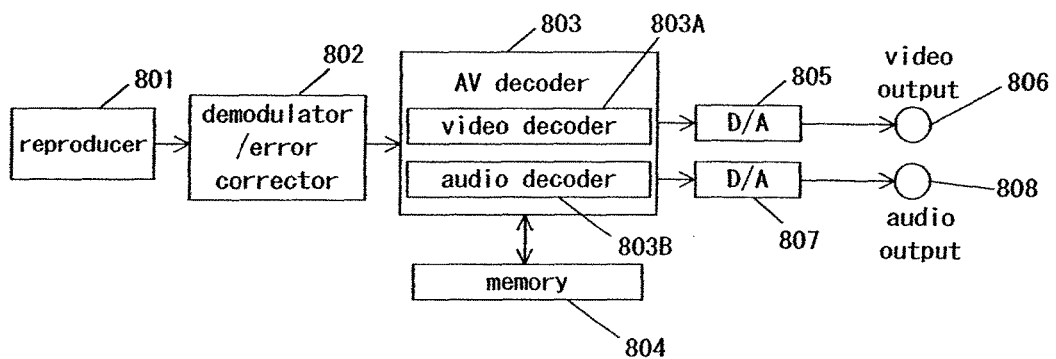
FIG. 13 is a block diagram of an AV reproduction system in a sixth embodiment of the present invention.

FIG. 13 is a block diagram of an AV reproduction system according to a sixth embodiment of the present invention.

The AV reproduction system of the present embodiment has a reproducer 801, a demodulator/error corrector 802, an AV decoder 803, a memory 804, and D/A converters 805 and 807. The AV decoder 803 has a video decoder 803A and an audio decoder 803B.

The video decoder 803A is the video decoder of the fourth embodiment of the present invention shown in FIG. 10, and can be implemented by use of the signal-processing apparatus of the first embodiment of the present invention or the signal-processing apparatus of the second embodiment.

The audio decoder 803B is an audio decoder of the fifth embodiment of the present invention shown in FIG. 12. As mentioned in the fifth embodiment, in the processing of the audio decoder of the fifth embodiment, since the required processing amount is small compared to that of the image data processing, parallel processing can be performed by the signal-processing apparatus of the first embodiment applied to the video decoder 803A or the instruction-parallel processor 100 (FIG. 1 or FIG. 2) of the signal-processing apparatus of the second embodiment, and it is unnecessary to provide a different processor. Therefore, the AV decoder 803 can be structured by one signal-processing apparatus of the first embodiment or one signal-processing apparatus of the second embodiment.

The reproducer 801 reproduces media on which coded AV signals are recorded, and outputs reproduction signals. The reproducer 801 may be any reproducer that is capable of reproducing media on which coded AV signals according to the MPEG-4 AVC standard are recorded such as a DVD video reproducer or an HD (hard disk) video reproducer.

The demodulator/error corrector 802 demodulates the signal reproduced by the reproducer 801, error-corrects the demodulated signal, and outputs the error-corrected signal to the AV decoder 803.

The video decoder 803A of the AV decoder 803 decodes the coded video signal and outputs the decoded signal, and the outputted signal is converted to an analog signal by the D/A converter 805 and outputted as a video output 806.

The audio decoder 803B of the AV decoder 803 decodes the coded audio signal and outputs the decoded signal, and the outputted signal is converted to an analog signal by the D/A converter 807 and outputted as an audio output 808.

In the memory 804, AV signals before decoding, during decoding and/or after decoding, and other data are stored.

In the AV reproduction system of the present embodiment, part or all of the functions of the demodulator/error corrector 802 may be provided to the reproducer 801.

The AV reproduction system of the present embodiment can be used for receiving MPEG-4 AVC-compliant AV signals transmitted from CATV, the Internet or satellite communications, and can be also used for demodulating and decoding them. In this case, the AV reproduction system can be performed to input the received signal to the demodulator/error corrector 802 and decode the signal by the above-described process. Further, the AV reproduction system of the present embodiment can be applied as a digital television by displaying the video output on a display.

Seventh Embodiment

Figure 14:
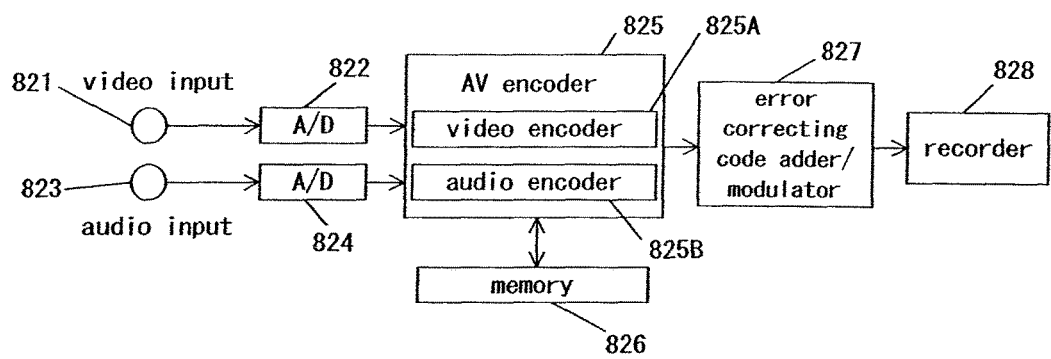
FIG. 14 is a block diagram of an AV recording system in a seventh embodiment of the present invention.

FIG. 14 is a block diagram of an AV recording system according to a seventh embodiment of the present invention.

The AV recording system of the present embodiment has an AV encoder 825, an error correcting code adder/modulator 827, a recorder 828, a memory 826 and A/D converters 822 and 824. The AV encoder 825 has a video encoder 825A and an audio encoder 825B.

The video encoder 825A is the video encoder of the third embodiment of the present invention shown in FIG. 3, and can be implemented by use of the signal-processing apparatus of the first embodiment of the present invention or the signal-processing apparatus of the second embodiment.

The audio encoder 825B is an audio encoder of the fifth embodiment of the present invention shown in FIG. 11. As mentioned in the fifth embodiment, in the processing of the audio encoder of the fifth embodiment, since the required processing amount is small compared to that of the image data processing, parallel processing can be performed by the instruction-parallel processor 100 (FIG. 1 or FIG. 2) of the signal-processing apparatus of the first embodiment or the signal-processing apparatus of the second embodiment applied to the video encoder 825A, and it is unnecessary to provide a different processor. Therefore, the AV encoder 825 can be structured by one signal-processing apparatus of the first embodiment or one signal-processing apparatus of the second embodiment.

The outline of the operation of the AV recording system of the present embodiment is now described.

A video input 821 is A/D converted by the A/D converter 822, an audio input 823 is A/D converted by the A/D converter 824, and these are outputted to the A/V encoder 825.

The video encoder 825A of the AV encoder 825 encodes the inputted video signal according to the MPEG-4 AVC specifications, and outputs the signal as an encoded video bit stream. Likewise, the audio encoder 825B encodes the inputted audio signal according to the MPEG-4 AVC specifications, and outputs the signal as an encoded audio bit stream.

The error corrector/modulator 827 adds an error correcting code to the encoded video bit stream and the encoded audio bit stream outputted by the AV encoder 825, modulates the bit streams, and outputs them to the recorder.

The recorder 828 records the modulated AV signal onto a recording medium. The recording medium includes an optical medium such as a DVD, a magnetic recording medium such as an HD (hard disk) or a semiconductor memory.

In the memory 826, AV signals before encoding, during encoding and/or after encoding by the AV encoder 825, and other data are stored.

In the AV recording system of the present embodiment, part or all of the functions of the error corrector/modulator 827 may be included in the recorder 828.

The AV recording system of the present embodiment can be used as a video camera system in which a video camera is connected to an input and the signal therefrom is encoded and recorded according to the MPEG-4 AVC specifications.

Eighth Embodiment

Figure 15:
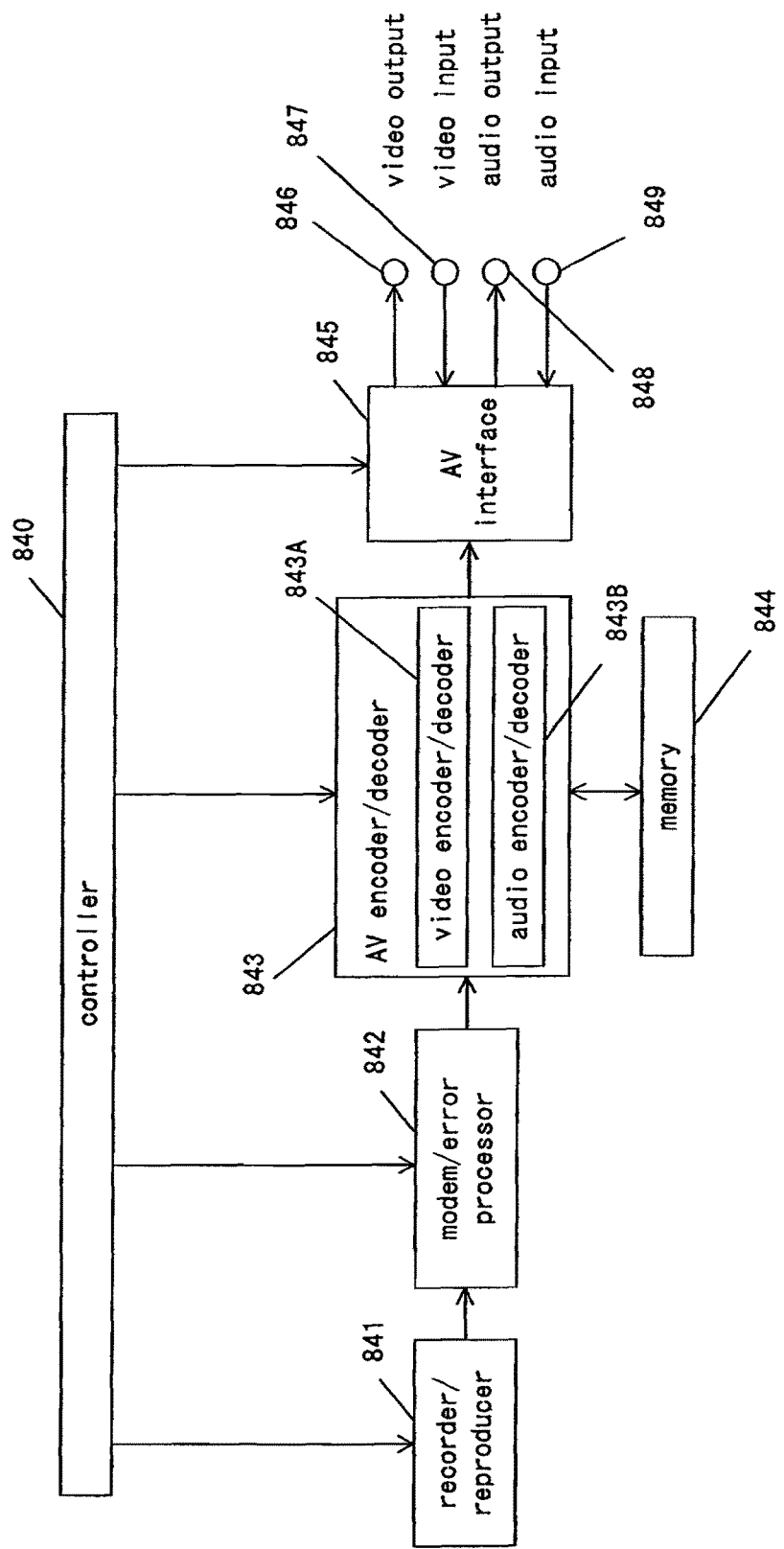
FIG. 15 is a block diagram of an AV recording/reproduction system in an eighth embodiment of the present invention.
Figure 16:
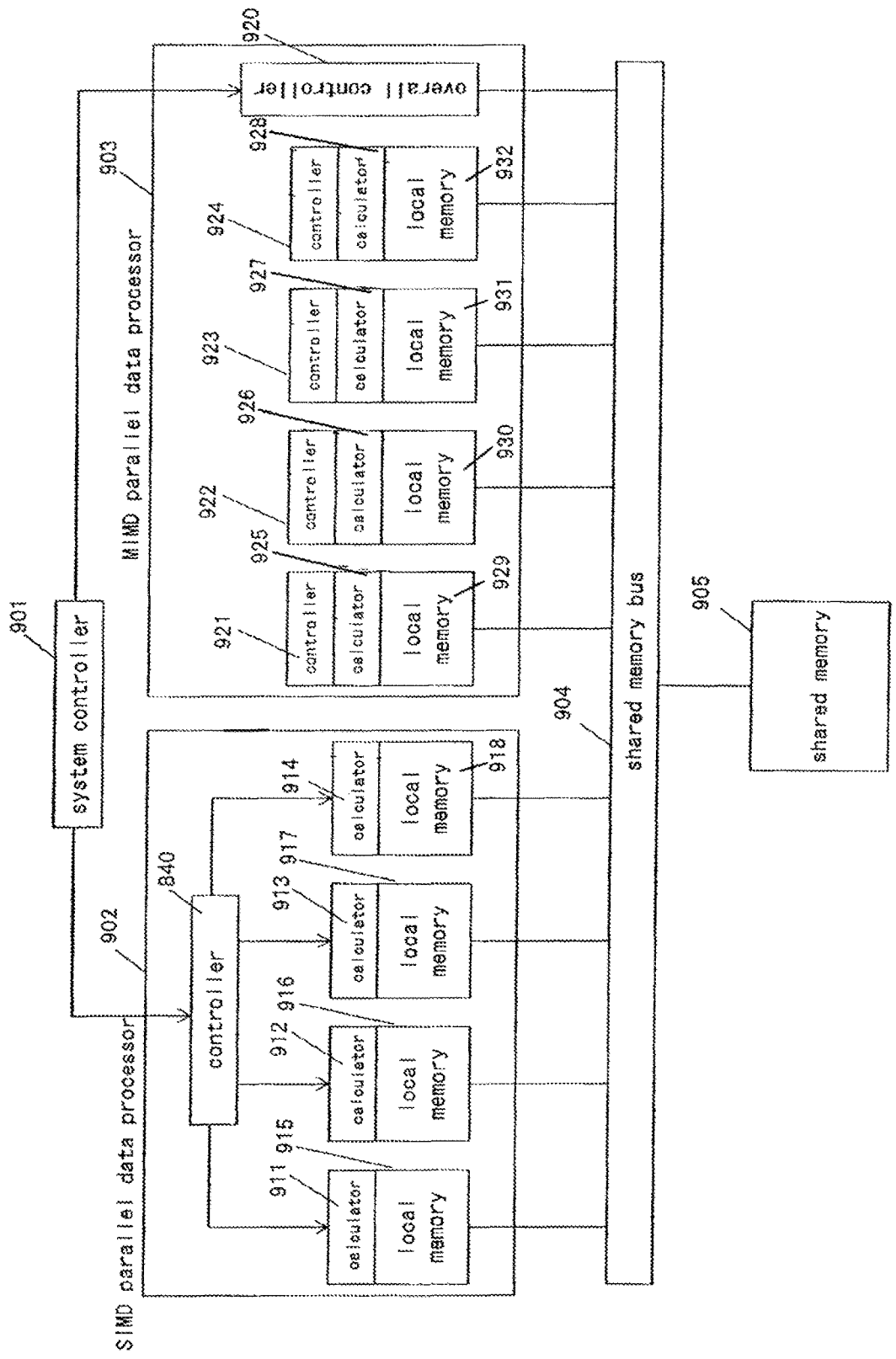
FIG. 16 is a block diagram of the prior signal-processing apparatus comprising a combination of the SIMD parallel data processor and the MIMD parallel data processor.

FIG. 15 is a block diagram of an AV recording/reproduction system according to an eighth embodiment of the present invention. The AV recording/reproduction system of the present embodiment has a controller 840, a recorder/reproducer 841, a modem/error processor 842, an AV encoder/decoder 843, an AV interface 845 and a memory 844. The AV encoder/decoder 843 has a video encoder/decoder 843A and an audio encoder/decoder 843B. The AV interface 845 has video input and output, and audio input and output.

As for the function, the AV encoder/decoder 843 has functions equal to those of the video encoder of the third embodiment of the present invention, the video decoder of the fourth embodiment and the audio encoder and the audio decoder of the fifth embodiment, and is structured by one signal-processing apparatus of the first embodiment or one signal-processing apparatus of the second embodiment. Descriptions of the operation thereof are omitted in this embodiment because they have already been given.

The recorder/reproducer 841 records/reproduces modulated AV signals according to the MPEG-4 AVC specifications. The recording medium includes an optical medium such as a DVD, a magnetic recording medium such as an HD (hard disk) or a semiconductor memory. The recorder/reproducer 841 has a different recording/reproduction mechanism according to the recording medium being used.

The modem/error processor 842, at the time of recording, adds an error correcting code to the video bit stream and the audio bit stream encoded by the AV encoder/decoder 843, modulates the bit streams, and transmits them to the recorder/reproducer 841. The modem/error processor 842, at the time of reproduction, demodulates the AV signal reproduced by the recorder/reproducer 841, error-corrects the demodulated signal, and then, transmits the video bit stream and the audio bit stream to the AV encoder/decoder 843.

The AV interface 845, at the time of reproduction, D/A converts the video signal and the audio signal decoded by the AV encoder/decoder 843, and outputs a video output 846 and an audio output 848. The AV interface 845, at the time of recording, A/D converts a video input 847 and an audio input 849, and transmits them to the AV encoder/decoder 843.

In the memory 844, AV signals before encoding, during encoding and/or after encoding and AV signals before decoding, during decoding and/or after decoding by the AV encoder/decoder 843, and other data are stored.

The controller 840 controls the recorder/reproducer 841, the modem/error processor 842, the AV encoder/decoder 843 and the AV interface 845 to switch the functions thereof between at the time of recording and at the time of reproduction, and controls data transfer.

In the AV recording/reproduction system of the present embodiment, part or all of the functions of the modem/error processor 842 may be included in the recorder/reproducer 841.

As described above in detail, the signal-processing apparatus of the present invention and an electronic apparatus using the same are expected to be applied to various electronic apparatuses to which the MPEG-4 AVC encoding standard is applied. The application to electronic apparatuses is over a wide range from domestic stationary terminals to battery-driven mobile terminals such as DVD systems, video camera systems and picture-phone systems for mobile telephones currently performed according to the MPEG-2.

In these systems, the performance required of the LSI realizing the MPEG-4 AVC standard differs according to the manner of system application. For stationary systems, since large image sizes are handled, processing performance is important, whereas for mobile terminals, reduction in power consumption is important to increase the battery life. The signal-processing apparatus of the present invention and an electronic apparatus using the same are applicable to both of them. That is, by combining the instruction-parallel processor, the data-parallel processor and the dedicated hardware, an improvement in processing performance and a reduction in power consumption are enabled.

The signal-processing apparatus of the present invention comprises a plurality of SIMD processors (in the example of FIG. 1, the first data-parallel processor 101 and the second data-parallel processor 102). One SIMD processor includes eight processing elements, and eight data streams can be processed in parallel at one instruction. By changing the number of provided SIMD processors according to the purpose for using the signal-processing apparatus, various performance requirements can be met without the LSI architecture being changed.

For example, in the signal-processing apparatus for mobile terminals requiring low power consumption, by providing two SIMD processors, the degree of parallelism can be made 16, so that a low-voltage operation and the reduction in operating frequency are enabled.

Moreover, instead of using the degree of parallelism of 16, it can be implemented using two pairs of SIMD processors each comprising eight processing elements and causing them to perform different processing.

By dividing the entire processor and performing parallel processing such that the second SIMD processor performs DCT processing while the first SIMD processor is performing the pixel value calculation of the motion compensation, a plurality of processing can be performed while the operating ratios are maintained. Consequently, the calculation performance can be significantly improved.

While applications conforming to the MPEG-4 AVC standard are described in the above-described embodiments, the present invention is not limited to these applications. The gist of the present invention is to realize an improvement in processing performance and a reduction in power consumption by combining the instruction-parallel processor, the data-parallel processor and the dedicated hardware, and various applications are possible without departing from the gist of the invention.

According to the present invention, a signal-processing apparatus capable of performing high-performance and high-efficiency image processing for image processing requiring a large data processing amount like the encoding/decoding processing of the MPEG-4 AVC, and an electronic apparatus using the same can be provided.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A signal-processing apparatus comprising:
a first processor;
a first data processing unit;
a second data processing unit; and
a second processor, wherein
both of said first data processing unit and said second data processing unit are managed by said first processor,
said second data processing unit is managed through said second processor, and said first data processing unit is controlled directly by said first processor,
said second processor, after receiving an instruction from said first processor, then independently controls said second data processing unit without further instruction from said first processor, and
said second data processing unit is configured with a data parallel processor and function-specific dedicated hardware to perform a plurality of data processing heterogeneously.

2. The signal-processing apparatus according to claim 1, wherein the plurality of data processing are shared between said data parallel processor and said function-specific dedicated hardware based on an object of processing, and said data parallel processor is separated from said function-specific dedicated hardware.

* * * * *